United States Patent
Huber et al.

(10) Patent No.: US 8,753,246 B2
(45) Date of Patent: Jun. 17, 2014

(54) METHOD AND DEVICE FOR STARTING AN INTERNAL COMBUSTION ENGINE OF A HYBRID DRIVE TRAIN

(75) Inventors: Thomas Huber, Daisbach (DE); Michael Lehner, Wiernsheim (DE); Oliver Kaefer, Murr (DE); Karsten Mann, Stuttgart (DE); Anja Winter-Mann, legal representative, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 903 days.

(21) Appl. No.: 13/001,163

(22) PCT Filed: Apr. 28, 2009

(86) PCT No.: PCT/EP2009/055135
§ 371 (c)(1),
(2), (4) Date: Aug. 11, 2011

(87) PCT Pub. No.: WO2009/156218
PCT Pub. Date: Dec. 30, 2009

(65) Prior Publication Data
US 2012/0122630 A1    May 17, 2012

(30) Foreign Application Priority Data
Jun. 26, 2008    (DE) .......................... 10 2008 002 666

(51) Int. Cl.
*B60W 20/00* (2006.01)
*B60W 10/08* (2006.01)
*F02N 7/08* (2006.01)

(52) U.S. Cl.
USPC .......... 477/5; 477/97; 180/65.285; 123/179.3

(58) Field of Classification Search
USPC .......... 477/5, 97; 180/65.265, 65.28, 65.285, 180/65.29; 123/179.3, 179.4; 290/31
See application file for complete search history.

(56) References Cited

U.S. PATENT DOCUMENTS

| | | | |
|---|---|---|---|
| 6,250,270 B1 | 6/2001 | Ahner et al. | |
| 6,581,559 B1 | 6/2003 | Grob et al. | |
| 7,013,213 B2 * | 3/2006 | McGee et al. | 701/113 |
| 7,962,278 B1 * | 6/2011 | Patterson et al. | 701/113 |
| 8,292,778 B2 * | 10/2012 | Watanabe et al. | 477/3 |

(Continued)

FOREIGN PATENT DOCUMENTS

| | | |
|---|---|---|
| DE | 196 45 943 | 5/1998 |
| DE | 198 58 992 | 10/1999 |

(Continued)

*Primary Examiner* — Roger Pang
*(74) Attorney, Agent, or Firm* — Kenyon & Kenyon LLP

(57) ABSTRACT

A method and a device are described for starting an internal combustion engine of a hybrid drive train, having an internal combustion engine and at least one additional machine, in particular an electric machine, a separating clutch, which is situated between the internal combustion engine and the additional machine, and a crankshaft angle sensor for detecting the instantaneous crankshaft angle of the internal combustion engine being provided. Arrangements are provided to perform the following operations to start the internal combustion engine when a high-voltage battery is essentially discharged, including a) the separating clutch is or has already been disengaged, b) the additional machine is accelerated, c) after conclusion of the acceleration operation of the additional machine, the separating clutch is engaged, so that the internal combustion engine is also accelerated, d) as soon as the crankshaft angle sensor system supplies a favorable crankshaft angle, the internal combustion engine is started by direct start.

12 Claims, 2 Drawing Sheets

(56) References Cited

U.S. PATENT DOCUMENTS

| | | |
|---|---|---|
| 2004/0139938 A1* | 7/2004 | Tanei et al. ............... 123/179.3 |
| 2004/0149247 A1* | 8/2004 | Kataoka et al. ........... 123/179.4 |
| 2007/0241611 A1 | 10/2007 | Shimada et al. |
| 2008/0078592 A1* | 4/2008 | Akasam et al. ............. 180/65.2 |
| 2009/0105038 A1* | 4/2009 | Weiss et al. ...................... 477/5 |
| 2010/0000813 A1* | 1/2010 | Wagner .................. 180/65.265 |
| 2012/0309587 A1* | 12/2012 | Nozaki ............................ 477/5 |
| 2013/0040778 A1* | 2/2013 | Schulte et al. ................... 477/5 |

FOREIGN PATENT DOCUMENTS

| | | |
|---|---|---|
| DE | 199 56 384 | 11/2000 |
| DE | 10 2006 008640 | 8/2007 |
| DE | 10 2006 016138 | 10/2007 |
| DE | 10 2007 000227 | 11/2007 |
| DE | 10 2006 049 888 | 4/2008 |
| JP | 2003-515051 | 4/2003 |
| JP | 2009-527411 | 7/2009 |
| WO | WO 2007/115919 | 10/2007 |

* cited by examiner

METHOD AND DEVICE FOR STARTING AN INTERNAL COMBUSTION ENGINE OF A HYBRID DRIVE TRAIN

FIELD OF THE INVENTION

The present invention is directed to a method and a device for starting an internal combustion engine having the features described herein.

BACKGROUND INFORMATION

Hybrid vehicles usually have two different drive units, for example, an internal combustion engine, which is operated using a fuel, and an electric machine, which draws its electrical power from an electrical storage device. Hybrid vehicles may be driven temporarily by the electric machine alone. However, if no more electrical power is available, the internal combustion engine is started and the vehicle is driven with this engine. A generator may be driven while the internal combustion engine is running. This generator in turn generates electrical power, which is stored in the electrical storage device. Electrical operation of the vehicle is then also possible.

There are believed to be various methods for starting the internal combustion engine. German patent document DE 196 45 943 proposes a starter unit, which allows two different starting methods. One starting method is a pulse start and the other is a direct start. The pulse start may be employed when the engine is cold, using the energy of a flywheel, and the direct start is used when the engine is hot, for example, at a stoplight. The best starting method in each case is thus selected automatically as a function of the temperature of the internal combustion engine.

SUMMARY OF THE INVENTION

The exemplary embodiments and/or exemplary methods of the present invention are directed to a method and a device for starting an internal combustion engine of a hybrid drive train. The hybrid drive train has an internal combustion engine and at least one additional machine, in particular an electric machine. A separating clutch is situated between the internal combustion engine and the additional machine. Furthermore, a crankshaft angle sensor system is provided for detecting the instantaneous crankshaft angle of the internal combustion engine. The crankshaft angle sensor system may include a rotational speed sensor having a rotational direction detector, for example. The instantaneous crankshaft angle of an internal combustion engine may thus be determined by using an appropriate analytical algorithm. According to the exemplary embodiments and/or exemplary methods of the present invention, a high-voltage battery is provided, but this high-voltage battery is essentially discharged. In particular, the energy in the high-voltage energy battery is no longer sufficient to start the internal combustion engine via the electric machine. To nevertheless implement the start of the internal combustion engine, the following method steps are performed:

a) the separating clutch is or has already been disengaged;
b) the additional machine is accelerated;
c) after conclusion of the acceleration operation of the additional machine, the separating clutch is engaged, so that the internal combustion engine is also accelerated;
d) as soon as the crankshaft angle sensor system supplies a favorable crankshaft angle, the internal combustion engine is started by direct start.

The technical background of the exemplary embodiments and/or exemplary methods of the present invention is that even if the high-voltage battery is discharged, there is nevertheless a possibility for starting the internal combustion engine. In the normal case, the high-voltage battery supplies enough energy to drive the electric machine and thus start the internal combustion engine conventionally by accelerating it to at least idling speed and then injecting fuel and igniting it. When the high-voltage battery is discharged, an attempt is made to start the internal combustion engine by a combination of pulse and the direct start method. In the pulse method, the internal combustion engine is at least turned over. As soon as a favorable crankshaft angle is detected, the internal combustion engine is started by the direct start method. For the pulse start method, the additional machine is accelerated while the separating clutch between the internal combustion engine and the additional machine is disengaged. By engaging the separating clutch, the internal combustion engine is subsequently turned over. A crankshaft angle sensor system detects the position of the crankshaft. As soon as a favorable crankshaft angle is detected, the direct start is implemented. Fuel is then injected into one cylinder and ignited. Fuel is injected into the cylinder, which is momentarily in the favorable position, i.e., after top dead center, so that the internal combustion engine may be started by igniting the fuel.

An advantage of the exemplary embodiments and/or exemplary methods of the present invention is that it presents a possibility for starting the internal combustion engine even if the high-voltage battery no longer supplies enough energy for a conventional start of the internal combustion engine. The internal combustion engine is started with the aid of the combination of the pulse method and the direct start method. When the internal combustion engine is running, the high-voltage battery is then rechargeable. For this purpose, the internal combustion engine is connected to a generator, which supplies electrical power for charging the high-voltage battery.

In another embodiment of the present invention, a low-voltage battery is provided. In this embodiment, the additional machine is accelerated with the aid of electrical power from the low-voltage battery. The technical background of this embodiment is that in addition to the high-voltage battery, which is also referred to as a traction battery, a vehicle electrical system battery or a starter battery is frequently also provided in these vehicles. This is used to supply electrical power to the vehicle electrical system and the control units of the vehicle. The high-voltage battery supplies electrical power to a high-voltage network, which has a voltage significantly higher than 24 volts, for example. The low-voltage battery supplies electrical power to a low-voltage network, which has approximately 12 volts, for example. In this embodiment of the present invention, the energy of this low-voltage battery is used to accelerate the additional machine. The pulse start method is then initiated using this rotational energy. The advantage of this embodiment is that the available energy from the low-voltage battery is used to accelerate the additional machine. The internal combustion engine may thus be started without supplying external energy, for example: via charging cable, starter cable, drive via rolling test stand, or by rolling the vehicle.

In another embodiment of the present invention, an inverter is additionally provided, so that the low voltage of the low-voltage battery may be transformed by the inverter, in such a way that the additional machine may be driven by the transformed voltage. The technical background of this embodiment is that when more than one voltage level is present in a vehicle, inverters are provided for transforming energy from one voltage level to another. Such an inverter is used to operate the additional machine with the aid of the energy from the low-voltage battery. The advantage of this embodiment is that the additional machine may be operated with the aid of the energy from the low-voltage battery.

In another embodiment of the present invention, another clutch is provided between the output of the hybrid drive train and the additional machine. This clutch remains disengaged while performing method steps a) through d). The technical background of this embodiment is that the method for starting the internal combustion engine is not affected by the forces acting on the output. The advantage of this embodiment is that neither a braking nor a driving torque may reach the additional machine or the internal combustion engine via the output.

Another embodiment of the present invention provides that the hybrid drive train has an output, and the additional machine is accelerated with the aid of the energy from the output. The output has drive wheels in particular. There is thus the possibility that the energy from the driven rotating drive wheels may be utilized to accelerate the additional machine. The technical background here is that any energy that might be available in the output is used to accelerate the additional machine. The advantage of this embodiment is that the additional machine may be accelerated regardless of the electrical power available.

In another embodiment, it is provided that the additional clutch between the output of the hybrid drive train and the additional machine is engaged during method step b). The technical background is that the additional clutch must be engaged in order for energy from the output to be transferable to the additional machine. The advantage of this embodiment is that regardless of any electrical power that might be present, engaging the additional clutch makes it possible for rotational energy to be transferred from the output to the additional machine.

In a further embodiment of the present invention, it is provided that this method for starting the internal combustion engine is used to initiate a charging operation of an essentially discharged high-voltage battery. The technical background is that the cause of this modified method for starting an internal combustion engine is an essentially discharged high-voltage battery. Therefore, a normal starting method is impossible. By charging the high-voltage battery, normal starting of the internal combustion engine should again be made possible. The advantage of this embodiment is that regardless of the presence of an external charger for the high-voltage battery, the latter may be recharged.

In another embodiment of the present invention, it is provided that the method is performed in a repair shop. The technical background is that vehicles having a discharged high-voltage battery, for example, due to a defect in the high-voltage battery, should be repaired in the repair shop. The repair thus also includes charging the high-voltage battery. It is advantageous here if no external charger is required to do so, but instead the vehicle may recharge the discharged high-voltage battery automatically after the internal combustion engine is started.

In another embodiment of the present invention, a rotational speed sensor system is provided for detecting the rotational speed of the additional machine. Method step b) is performed until the rotational speed sensor system supplies a rotational speed which exceeds a predefinable value. The technical background for this is that a certain rotational energy is required for successful implementation of method step c) for accelerating the internal combustion engine. The advantage of this embodiment is that it ensures that method step c) is performed only when enough rotational energy is present to adequately turn over the internal combustion engine.

In another embodiment, it is provided that a temperature sensor system is provided for detecting the temperature of the internal combustion engine. The method is performed in a modified manner as a function of the value supplied by the temperature sensor system. This method is modified in particular if the temperature sensor system supplies a value which exceeds a predefinable value. The technical background of this embodiment is that the implementation of the pulse start as well as the direct start is performed as a function of temperature.

In another embodiment, it is provided that the method is performed in a modified manner in such a way that the method is not performed for starting an internal combustion engine of a hybrid drive train. The technical background of this embodiment is that the direct start method is not promising when the temperature of the internal combustion engine is too high. The advantage of this embodiment is that in this case no energy is wasted to accelerate the electric machine.

In another embodiment of the present invention, it is provided that the method is performed in a modified manner in which method step d) of the method is modified in such a way that the internal combustion engine is started by direct start only when the crankshaft angle sensor system supplies a favorable crankshaft angle for at least the second time. The technical background of this embodiment is that direct start is not promising when the temperature of the internal combustion engine is too high. The internal combustion engine is therefore cooled by incoming and outgoing air by delaying the direct start until the crankshaft angle sensor system has supplied a favorable crankshaft angle for at least the second time. The advantage of this embodiment is that the energy of the accelerated additional machine may be utilized to start the internal combustion engine, even in the presence of a high temperature of the internal combustion engine.

Exemplary embodiments of the present invention are depicted in the drawings and explained in greater detail in the following description.

DETAILED DESCRIPTION

Figure 1:
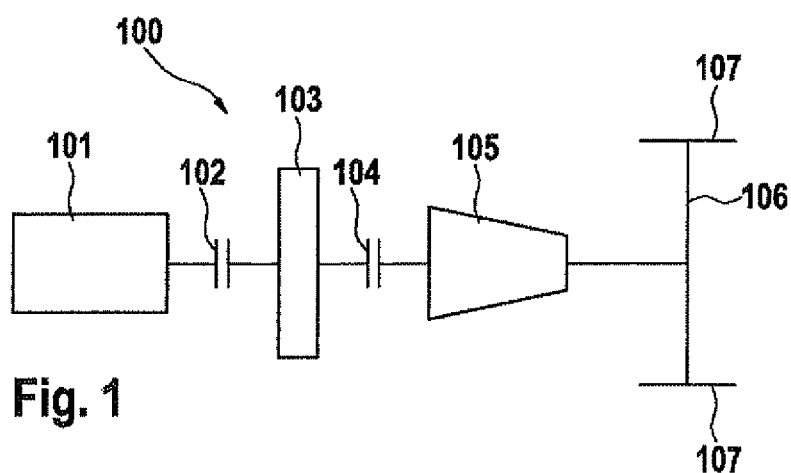
FIG. 1 shows a hybrid drive train.

FIG. 1 shows a hybrid drive train 100, which has an internal combustion engine 101 and an additional machine 103, in particular an electric machine. The output of hybrid drive train 100 is composed of transmission 105 as well as driving axle 106 and associated drive wheels 107. So-called separating clutch 102 is located between internal combustion engine 101 and additional machine 103. When separating clutch 102 is disengaged, both driving machines (101, 103) are able to rotate independently of one another. If separating clutch 102 is engaged, internal combustion engine 101 is connected to additional machine 103 in an essentially rotatably locked manner. Another clutch 104 is located between the output and additional machine 103. The output is able to rotate independently of additional machine 103 when additional clutch 104 is in the disengaged state. In the engaged state of additional clutch 104, additional machine 103 is connected to the output in an essentially rotatably locked manner. Depending on the design of the vehicle, additional clutch 104 may be an ordinary clutch, e.g., a friction clutch. In the case of an automatic transmission, transmission 105 may be implemented together with additional clutch 104 in a shared component. Additional clutch 104 could then be designed as a rotational torque converter or a starter element in particular. This mechanical design makes it possible for the vehicle to be driven either by additional machine 103 alone or together with internal combustion engine 101. However, there is also the possibility that internal combustion engine 101 drives the vehicle alone but then also drives additional machine 103. The output is to be completely decoupled from the two drive units with the aid of additional clutch 104. On the other hand, there is a possibility of operating additional machine 103 alone by disengaging clutches 102 and 104 but also the possibility of driving additional machine 103 via the output by engaging additional clutch 104, for example, in the case of a rolling vehicle or on a rolling test stand. The latter is advantageous in a repair shop in particular. The output may be energetically decoupled from hybrid drive train 100 by disengaging additional clutch 104, so that there is the possibility of transferring the energy of additional machine 103 to internal combustion engine 101 by engaging separating clutch 102.

Figure 2:
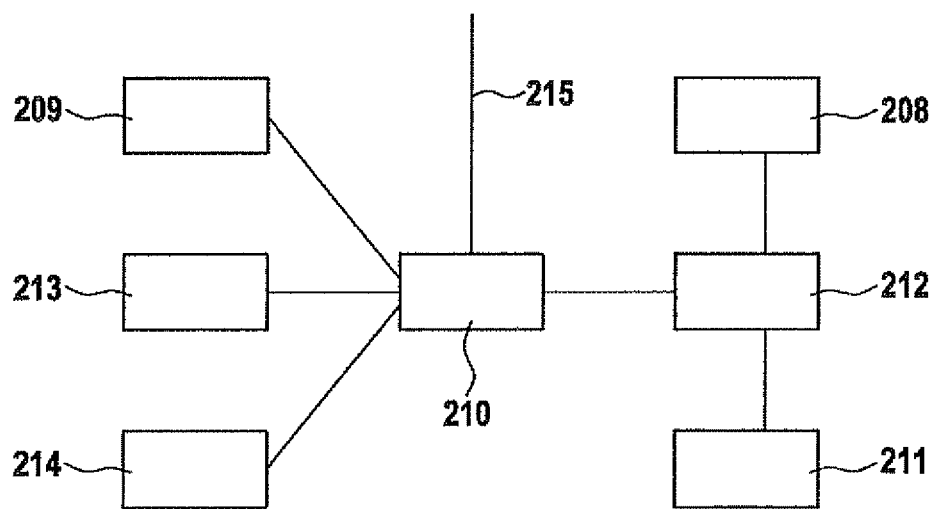
FIG. 2 shows additional components of a hybrid drive train.

FIG. 2 shows other components of a hybrid drive train. This figure illustrates a crankshaft angle sensor system 209 for detecting the instantaneous crankshaft angle, a rotational speed sensor system 213 for detecting the rotational speed of additional machine 103, and a temperature sensor system 214 for detecting the temperature of internal combustion engine 101. In addition, high-voltage battery 208 is also shown. High-voltage battery 208 has a voltage suitable for driving additional machine 103, in particular an electric machine. It is also referred to as a traction battery. Low-voltage battery 211 has a low voltage and is used to supply smaller auxiliary units and the control units of the vehicle. It is frequently also referred to as the vehicle electrical system battery or starter battery. The two voltage levels of high-voltage battery 208 and low-voltage battery 211 are coupled across an inverter 212, which is able to assume the function of an inverter as well as that of a rectifier. Control unit 210 communicates with the components in this figure as well as via connection 215 with the control devices of the components of hybrid drive train 100. There is also the possibility that the individual aforementioned components and/or control devices may be integrated into control unit 210 or mounted externally.

Figure 3:
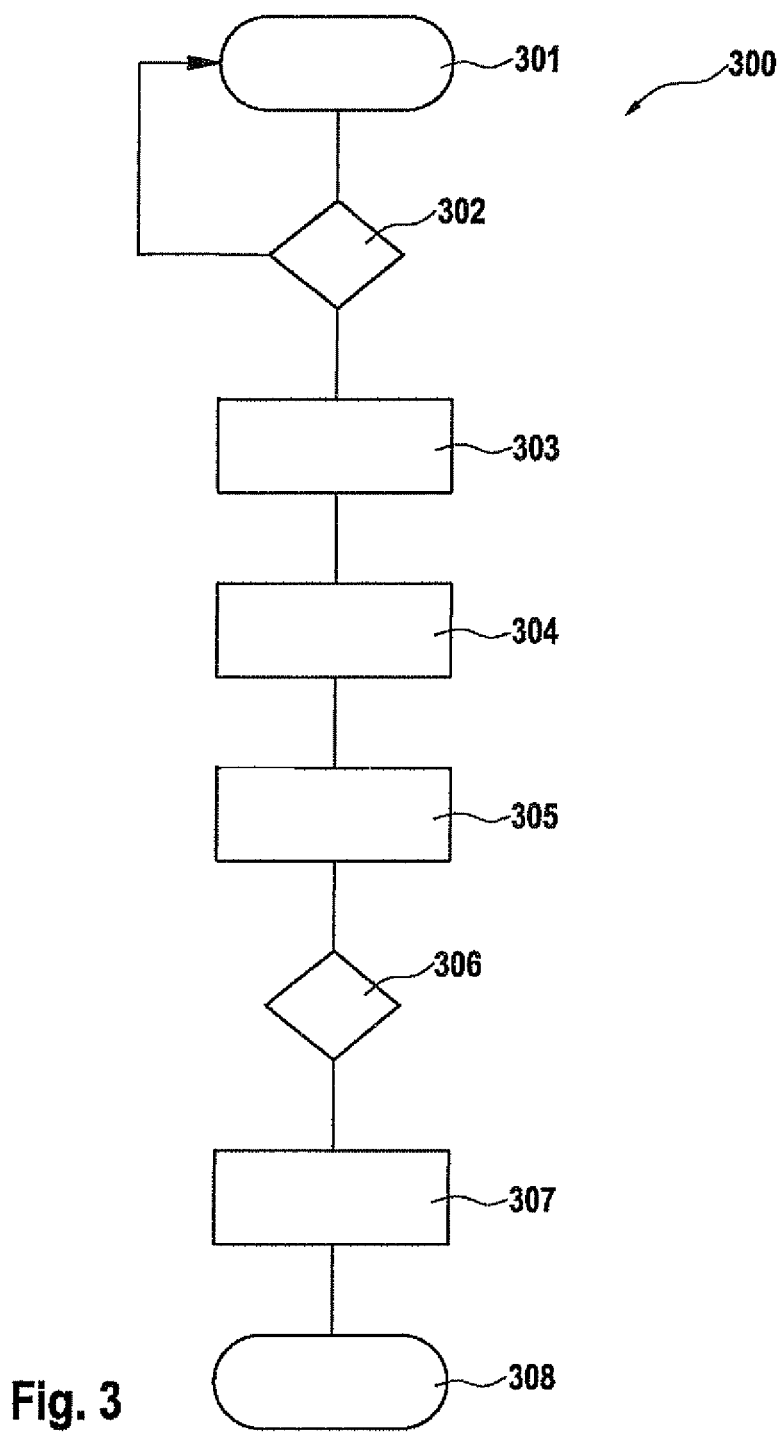
FIG. 3 shows a method for starting an internal combustion engine of a hybrid drive train.

FIG. 3 shows a method for starting an internal combustion engine 101 of hybrid drive train 100 having an internal combustion engine 101. The method begins in step 301. It is checked in step 302 whether high-voltage battery 208 is essentially discharged. In this case, if the energy of high-voltage 208 is no longer sufficient to adequately accelerate additional machine 103, so that internal combustion engine 101 may be started reliably, the method is executed further in step 303. Otherwise, the method returns to the beginning of the method in step 301. Step 303 ensures that separating clutch 102 is disengaged. Either it is already disengaged or, in case it is engaged, it is disengaged. Additional machine 103 is accelerated in step 304. In the case of an electric machine, this may be accomplished by supplying electrical power, for example, by applying an electrical voltage to the machine. Alternatively, it is conceivable for the energy of the output to be transferred to additional machine 103 by engaging additional clutch 104. In subsequent step 305, the energy of additional machine 103 is transferred to internal combustion engine 101 by engaging separating clutch 102. Therefore, internal combustion engine 101 is accelerated and turned over. Step 306 is performed until crankshaft angle sensor system 209 supplies a favorable crankshaft angle, so that internal combustion engine 101 may be started by direct start. This direct start is then implemented in step 307. The method ends in step 308.

What is claimed is:

1. A method for starting an internal combustion engine of a hybrid drive train having an internal combustion engine and at least one additional machine, which is an electric machine, the method comprising:
   when a high-voltage battery is essentially discharged, performing the following operations to start the internal combustion engine:
   (a) if not already disengaged, disengaging the separating clutch;
   (b) accelerating the additional machine in an acceleration operation;
   (c) engaging, after conclusion of the acceleration operation of the additional machine, the separating clutch, so that the internal combustion engine is also accelerated; and
   (d) as soon as a crankshaft angle sensor system supplies a favorable crankshaft angle, starting the internal combustion engine by direct start;
   wherein there is a separating clutch between the internal combustion engine and the additional machine, wherein the crankshaft angle sensor system is provided for detecting the instantaneous crankshaft angle of the internal combustion engine.

2. The method of claim 1, wherein the additional machine is accelerated with the aid of energy from a low-voltage battery.

3. The method of claim 2, wherein the low voltage of the low-voltage battery is transformed with the aid of an inverter so that the additional machine is operated by the transformed voltage.

4. The method of claim 2, wherein there is an additional clutch between the output of the hybrid drive train and the additional machine, and wherein the additional clutch is disengaged while performing operations (a) through (d) for starting the internal combustion.

5. The method of claim 1, wherein the hybrid drive train has an output which has drive wheels, and wherein the additional machine is accelerated with the aid of energy from the output by using the energy from the driven rotating drive wheels.

6. The method of claim 5, wherein an additional clutch is provided between the output of the hybrid drive train and the additional machine, and wherein the additional clutch is engaged during operation (b).

7. The method of claim 1, wherein the internal combustion engine is of a hybrid drive train is started to initiate a charging operation of an essentially discharged high-voltage battery.

8. The method of claim 1, wherein a rotational speed sensor system is provided for detecting the rotational speed of the additional machine, and wherein operation (b) is performed until the rotational speed sensor system supplies a rotational speed which exceeds a predefinable value.

9. The method of claim 1, wherein a temperature sensor system is provided for detecting the temperature of the internal combustion engine, and wherein the method is performed in a modified manner when the temperature sensor system supplies a value exceeding a predefinable value prior to performing the operations for starting the internal combustion engine.

10. The method of claim 9, wherein the method is performed in a modified manner so that the method for starting the internal combustion engine of a hybrid drive train is not performed.

11. The method of claim 9, wherein the method is performed in a modified manner so that operation (d) is modified so that the internal combustion engine is started by direct start only as soon as the crankshaft angle sensor system supplies a favorable crankshaft angle for at least a second time.

12. A device for starting an internal combustion engine of a hybrid drive train having an internal combustion engine and at least one additional machine, which is an electric machine, comprising:
- an arrangement to perform, when a high-voltage battery is essentially discharged, the following operations to start the internal combustion engine:
  - (a) if not already disengaged, disengaging the separating clutch;
  - (b) accelerating the additional machine in an acceleration operation;
  - (c) engaging, after conclusion of the acceleration operation of the additional machine, the separating clutch, so that the internal combustion engine is also accelerated; and
  - (d) as soon as a crankshaft angle sensor system supplies a favorable crankshaft angle, starting the internal combustion engine by direct start;
- wherein there is a separating clutch between the internal combustion engine and the additional machine, wherein the crankshaft angle sensor system is provided for detecting the instantaneous crankshaft angle of the internal combustion engine.

\* \* \* \* \*